United States Patent
Bildtsén et al.

[11] Patent Number: 5,863,135
[45] Date of Patent: Jan. 26, 1999

[54] ROLLING BEARING

[75] Inventors: Christian Bildtsén, Lerum; Göran Lindsten, Mölndal; Hans Wendeberg, Frölunda, all of Sweden

[73] Assignee: Aktieboalget SKF, Gothenburg, Sweden

[21] Appl. No.: 795,929

[22] Filed: Feb. 5, 1997

[30] Foreign Application Priority Data

Feb. 5, 1996 [SE] Sweden ................................. 9600408

[51] Int. Cl.⁶ ...................................................... F16C 33/72
[52] U.S. Cl. .......................... 384/477; 384/476; 384/484; 277/919
[58] Field of Search ..................................... 384/448, 476, 384/477, 484; 277/901, 919; 439/17

[56] References Cited

U.S. PATENT DOCUMENTS

| | | | |
|---|---|---|---|
| 3,564,477 | 2/1971 | Pompei | 439/17 |
| 4,237,296 | 12/1980 | Meyer | 340/682 |
| 4,797,013 | 1/1989 | Raj et al. | 384/462 |
| 4,856,916 | 8/1989 | Ito et al. | 384/476 X |
| 4,886,377 | 12/1989 | Adachi et al. | 384/49 |
| 4,946,296 | 8/1990 | Olschewski et al. | 384/448 |
| 4,963,040 | 10/1990 | Takebayashi et al. | 384/492 |
| 5,058,434 | 10/1991 | Zaschel | 73/659 |
| 5,139,425 | 8/1992 | Daviet et al. | 277/901 X |
| 5,152,539 | 10/1992 | Takii et al. | 277/80 |

FOREIGN PATENT DOCUMENTS

| | | |
|---|---|---|
| 1 042 305 | 10/1958 | Germany . |
| 59-170523 | 9/1984 | Japan . |
| 245874 | 12/1985 | Japan ..................................... 277/901 |

*Primary Examiner*—Thomas R. Hannon
*Attorney, Agent, or Firm*—Burns, Doane, Swecker, & Mathis, L.L.P.

[57] ABSTRACT

A rolling bearing includes an outer race ring, an inner race ring and a plurality of rolling bodies arranged between the race rings and adapted to roll against race tracks provided in the race ring surfaces facing each other. The bearing further includes at least one member spaced apart from the race tracks and contacting both race rings. The rolling bodies are electrically non-conductive while the at least one member contacting both race rings is highly electrically conductive, thereby allowing the transfer of electrical currents out of the bearing in an unharmful manner and/or the transfer of electrical signals through the bearing for processing outside the bearing.

15 Claims, 1 Drawing Sheet

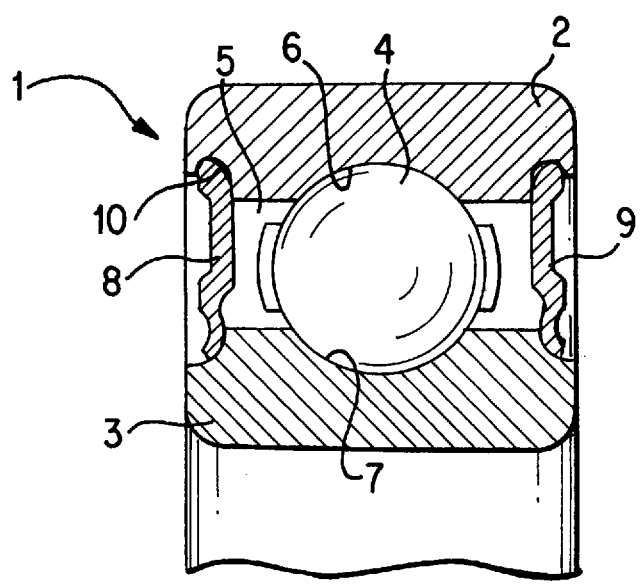

ROLLING BEARING

FIELD OF THE INVENTION

The present invention generally relates to roller bearings, and more particularly to a roller bearing that allows current to be lead away from the bearing and/or electrical signals to be transferred out of the bearing.

BACKGROUND OF THE INVENTION

In modern bearing technology it is often desirable to be able to determine different bearing parameters and/or bearing assembly parameters by taking out or obtaining different signals from the bearing for processing in a desired manner, and/or to allow signal transfer between a shaft on which the inner race ring of the bearing is mounted and a housing in which the outer race ring of the bearing is arranged.

For different signals, different solutions have been developed, whereby in order to take out different signals there have been developed different separate current transferring arrangements, e.g. radio transmitters, which transmit the signals to receivers outside the bearing. Such systems are oftentimes complicated and cumbersome, and they present the possibility of causing spark erosion in the functional surfaces of the bearing or causing other operational disturbances in the bearing.

SUMMARY OF THE INVENTION

The present invention addresses the foregoing problems and provides a rolling bearing that makes it possible to obtain a simple transfer of electrical signals. The present invention also makes it possible to easily lead away current from the bearing.

According to one aspect of the invention, a rolling bearing includes an outer race ring and an inner race ring, with the outer race ring and the inner race ring each having a race ring surface. The race ring surface of the outer race ring faces the race ring surface of the inner ring surface, and a race track is provided on each of the race ring surfaces. A plurality of rolling bodies are arranged between the inner race ring and the outer race ring for rolling against the race tracks. A member made of highly conductive material is mounted on one of the race rings, is spaced apart from the race tracks and contacts both the inner and outer race rings. The rolling bodies are electrically non-conductive, and the member made of highly electrically conductive material is designed to allow the transfer of electrical currents out of the bearing in an unharmful manner and the transfer of electrical signals through the bearing for processing outside the bearing.

According to another aspect of the invention, a rolling bearing includes an outer race ring and an inner race ring, with the outer race ring being provided with a race track and the inner race ring being provided with a race track. The race track of the outer race ring and the race track of the inner race ring face one another, and a plurality of rolling bodies are arranged between the inner race ring and the outer race ring for rolling against the race tracks. An electrically conductive member is positioned at one axial end of the race tracks. The electrically conductive member is spaced from the race tracks and contacts both the inner and outer race rings.

BRIEF DESCRIPTION OF THE DRAWING FIGURE

Further details and features of the present invention will become more apparent from the detailed description set forth below considered in conjunction with the accompanying drawing figure which is a cross-sectional view of a portion of a ball bearing according to the present invention.

DETAILED DESCRIPTION OF THE INVENTION

The drawing figure shows in, cross section, a portion of a ball bearing 1 provided with an outer race ring 2, an inner race ring 3 positioned concentrically in the outer race ring, and a number of rolling bodies 4 (e.g., balls) that are guided and spaced apart in a cage 5. The inwardly facing bearing surface of the outer race ring 2 is provided with a race track 6 while the outwardly facing bearing surface of the inner race ring 3 is also provided with a race track 7. The rolling bodies 4 roll against the pair of spaced apart race tracks 6, 7 formed in the inner and outer bearing ring surfaces that face each other. The rolling bodies 4 in this case are electrically non-conductive, and can preferably be manufactured from ceramic material.

Positioned between the outer and inner bearing rings 2, 3 and located axially outside the race tracks 6, 7 are a pair of substantially annular sealing members 8, 9. The annular sealing members 8, 9 are preferably disposed at both axial ends of the race tracks 6, 7. In the embodiment shown, each of the annular sealing members 8, 9 is fixedly attached in an annular groove 10 provided in the outer race ring 2. Each annular sealing member 8, 9 has a flexible inner edge that is adapted to slidingly contact the inner race ring 3 along an arcuate recess provided along the outer periphery of the inner race ring 3 at the axial ends.

At least one of the sealing members 8, 9 has a high degree of electric conductivity and thus can be produced from a highly conductive material, or can be provided with inserts, coatings or the like that make it highly conductive. Such materials are preferably polymers. Of course, both sealing members 8, 9 can possess a high degree of electrical conductivity by virtue of being constructed in one of the aforementioned ways.

In this manner it is possible to protect the functional surfaces of the bearing, i.e. the race tracks 6, 7, and the rolling bodies 4 from electrical transfer which could otherwise have a negative influence upon the operation of the bearing. By virtue of the present invention, there is an integrated signal transfer and transfer of electric currents via the sealing member. This allows the transfer of signals or current to the race ring, e.g. the outer race ring 2, which is non-rotating and fixedly mounted in a bearing housing, from which the signals can be easily led away in a conventional manner for processing as desired in an appropriate place. Also, electric current can be easily led away from the bearing in an unharmful manner, so that there is no risk that electrical spark erosion will occur in the functional surfaces.

By using non-conductive rolling bodies and a seal or cage acting as described for effecting the transfer of electric current, the bearing will operate without being disturbed by the current, and the transfer of the signal current is effected without variations in the resistance over the bearing, which would otherwise be the result if the current transfer should occur via the rolling bodies.

Although the bearing according to the present invention has been shown as a single row deep groove ball bearing, the invention can of course be applied to any type of rolling bearing. Further, it is possible to use non-conductive rolling bodies that are either made of non-conductive material or provided with a non-conductive coating.

In the embodiment of the present invention shown in the drawing figure and described above, the transfer of the signals between the two race rings is effected by means of at least one of the sealing members, but it is of course possible to provide for signal transfer in a similar manner through e.g. a conductive two part seal having one sealing member fixedly connected to each bearing race ring and slidingly contacting each other, or via a conductive rolling body cage contacting both race rings. Even in this case, the signal transfer from the rotary race ring takes place via members spaced from the functioning surfaces of the bearing, thus preventing them from being affected by negative current influences.

The principles, preferred embodiments and mode of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A rolling bearing comprising an outer race ring and an inner race ring, the outer race ring and the inner race ring each having a race ring surface with the race ring surface of the outer race ring facing the race ring surface of the inner race ring, a race track provided on each of said race ring surfaces, a plurality of rolling bodies arranged between said inner race ring and the outer race ring for rolling against the race tracks, at least one electrically conductive sealing member having first and second ends, the first end of the electrically conductive sealing member being fixedly attached to one of the outer race ring and the inner race ring at a position spaced axially outwardly of the race ring surfaces of the inner and outer race rings that face one another, the second end of the electrically conductive sealing member slidingly contacting the other of the outer race ring and the inner race ring at a position spaced axially outwardly of the race ring surfaces of the inner and outer race rings, said rolling bodies being electrically non-conductive, and said electrically conductive sealing member allowing transfer of electrical currents out of the bearing in an unharmful manner and transfer of electrical signals through the bearing for processing outside the bearing.

2. A rolling bearing as claimed in claim 1, wherein said electrically conductive sealing member is made of electrically conductive material.

3. A rolling bearing as claimed in claim 2, wherein said electrically conductive material is a polymer.

4. A roller bearing as claimed in claim 1, wherein said electrically conductive sealing member is made of portions of electrically conductive material.

5. A rolling bearing as claimed in claim 1, wherein the rolling bodies are made from non-conductive ceramic material.

6. A rolling bearing as claimed in claim 1, wherein the rolling bodies are coated with a non-conductive material.

7. A rolling bearing as claimed in claim 1, wherein said electrically conductive sealing member is a first electrically conductive annular sealing member disposed at one axial end of the inner and outer race rings, and including a second electrically conductive annular sealing member that is positioned at an axial end of the inner and outer race rings that is opposite said one axial end, said second electrically conductive annular sealing member being spaced from the race tracks and contacting both the inner and outer race rings, each of said first and second electrically conductive annular sealing members slidingly contacting a recess provided on the inner race ring.

8. A rolling bearing comprising an outer race ring and an inner race ring, the outer race ring being provided with a race ring surface having a race track and the inner race ring being provided with a race ring surface having a race track, the race ring surface of the outer race ring and the race ring surface of the inner race ring facing one another, a plurality of electrically non-conductive rolling bodies arranged between said inner race ring and the outer race ring for rolling against the race tracks, and electrically conductive sealing member positioned at one axial end of the race tracks, said electrically conductive sealing member having first and second ends, the first end of the electrically conductive sealing member being fixed to the outer race ring at a position spaced axially outwardly of the race ring surface of the outer race ring that faces the race ring surface of the inner race ring, the second end of the electrically conductive sealing member slidingly contacting the inner race ring at a position spaced axially outwardly of the race ring surface of the inner race ring that faces the race ring surface of the outer race ring.

9. A rolling bearing as claimed in claim 8, wherein the rolling bodies are coated with a non-conductive material.

10. A rolling bearing as claimed in claim 8, wherein said electrically conductive member is a first electrically conductive member, and including a second electrically conductive member that is positioned at an axial end of the race tracks that is opposite said one axial end, said second electrically conductive member being spaced from the race tracks and contacting both the inner and outer race rings.

11. A rolling bearing as claimed in claim 8, said electrically conductive member is made of electrically conductive material.

12. A rolling bearing as claimed in claim 11, wherein said electrically conductive material is a polymer.

13. A roller bearing as claimed in claim 8, wherein said electrically conductive member is made of portions of electrically conductive material.

14. A rolling bearing as claimed in claim 8, wherein the rolling bodies are made from non-conductive ceramic material.

15. A rolling bearing as claimed in claim 8, wherein said electrically conductive sealing member is a first electrically conductive sealing member, and including a second electrically conductive sealing member that is positioned at an axial end of the race tracks that is opposite said one axial end, said second electrically conductive sealing member being spaced from the race tracks and contacting both the inner and outer race rings, each of said first and second electrically conductive sealing members being an annular sealing member that slidingly contacts a recess provided on the inner race ring.

* * * * *